United States Patent
Duffy et al.

(10) Patent No.: US 8,633,653 B2
(45) Date of Patent: Jan. 21, 2014

(54) LIGHTING CONTROL SYSTEM WITH IMPROVED EFFICIENCY

(75) Inventors: Mark Duffy, Shaker Heights, OH (US); Bruce Roberts, Mentor-on-the-Lake, OH (US); Jeffrey Plaskon, Mentor, OH (US); Lazlo Balazs, Budapest (HU); Istvan Maros, Budapest (HU); Avi Shertok, University Heights, OH (US)

(73) Assignee: General Electric Company, Schenectady, NY (US)

( * ) Notice: Subject to any disclaimer, the term of this patent is extended or adjusted under 35 U.S.C. 154(b) by 995 days.

(21) Appl. No.: 12/715,688

(22) Filed: Mar. 2, 2010

(65) Prior Publication Data
US 2011/0215730 A1   Sep. 8, 2011

(51) Int. Cl.
*H05B 37/02* (2006.01)

(52) U.S. Cl.
USPC ............................ 315/291; 315/294; 315/312

(58) Field of Classification Search
USPC ......... 315/246–247, 291, 294, 295, 296, 297, 315/307, 308, 312, 360
See application file for complete search history.

(56) References Cited

U.S. PATENT DOCUMENTS

| | | | |
|---|---|---|---|
| 4,358,710 A | 11/1982 | Magai | |
| 4,388,566 A | 6/1983 | Bedard et al. | |
| 4,604,552 A | 8/1986 | Alley et al. | |
| 4,704,563 A | 11/1987 | Hussey | |
| 4,928,038 A | 5/1990 | Nerone | |
| 5,317,237 A | 5/1994 | Allison et al. | |
| 5,471,119 A * | 11/1995 | Ranganath et al. | 315/307 |
| 5,701,059 A | 12/1997 | Steigerwald et al. | |
| 5,703,441 A | 12/1997 | Steigerwald et al. | |
| 5,910,709 A | 6/1999 | Stevaocic | |
| 5,965,985 A | 10/1999 | Nerone | |
| 6,153,984 A * | 11/2000 | Fishbein et al. | 315/291 |
| 6,175,198 B1 | 1/2001 | Nerone | |
| 6,218,788 B1 | 4/2001 | Chen et al. | |
| 6,339,298 B1 | 1/2002 | Chen | |
| 6,348,767 B1 | 2/2002 | Chen et al. | |
| 6,392,366 B1 | 5/2002 | Nerone | |
| 6,628,093 B2 * | 9/2003 | Stevens | 315/291 |
| 7,075,251 B2 | 7/2006 | Chen et al. | |
| 7,279,854 B2 | 10/2007 | Nerone | |
| 2002/0101193 A1 | 8/2002 | Farkas et al. | |
| 2006/0125426 A1 * | 6/2006 | Veskovic et al. | 315/312 |
| 2008/0224630 A1 * | 9/2008 | Xu | 315/291 |
| 2008/0284356 A1 * | 11/2008 | Yuen | 315/307 |
| 2009/0147176 A1 | 6/2009 | Kron et al. | |
| 2009/0278472 A1 * | 11/2009 | Mills et al. | 315/294 |
| 2010/0134035 A1 | 6/2010 | Shertok et al. | |
| 2010/0253244 A1 * | 10/2010 | Snook et al. | 315/307 |
| 2011/0241567 A1 * | 10/2011 | Covaro et al. | 315/297 |

\* cited by examiner

*Primary Examiner* — Tung X Le
(74) *Attorney, Agent, or Firm* — Fay Sharpe LLP

(57) ABSTRACT

A lighting system includes a plurality of fixtures, wherein each fixture includes a plurality of fluorescent lamps. A dimming ballast is operatively coupled to each fixture, each dimming ballast receives power from an outside source that is delivered to the fluorescent lamps within each corresponding fixture. A control module communicates with each dimming ballast, the control module receives a lighting level from an outside source, determines the most power efficient lighting solution and outputs a control signal to each dimming ballast related to the light output level of each lamp within each fixture.

17 Claims, 7 Drawing Sheets

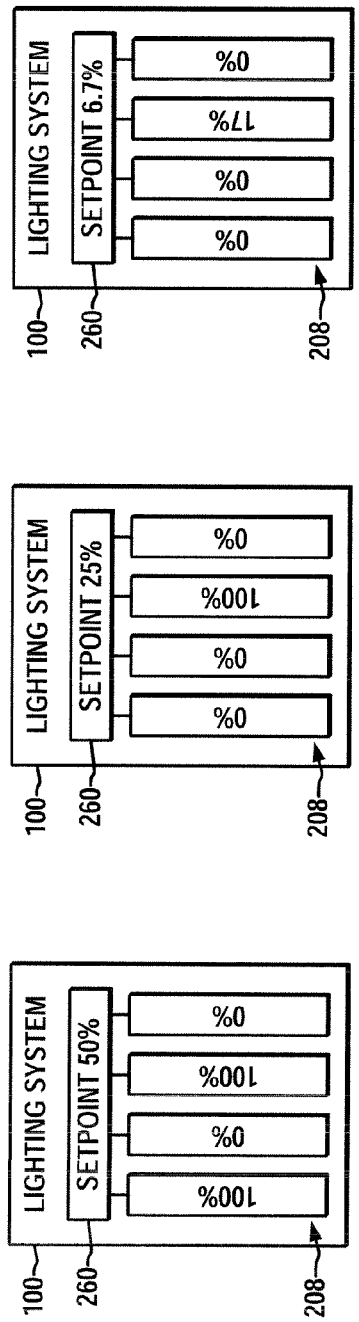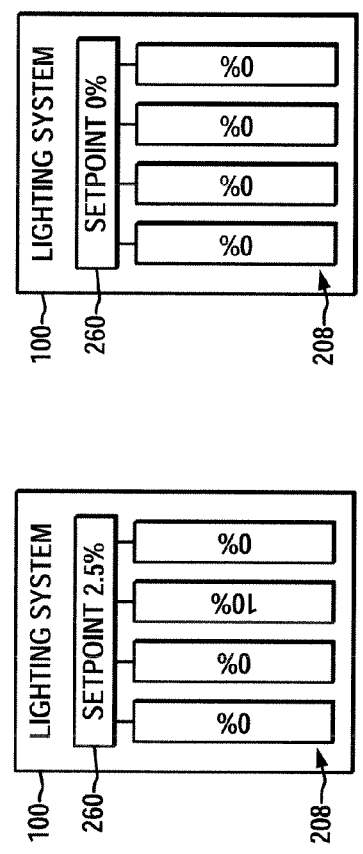

LIGHTING CONTROL SYSTEM WITH IMPROVED EFFICIENCY

BACKGROUND

The present application is directed to controls for lighting systems. It finds particular application in the efficient use of power in dimming applications, and will be described with particular reference thereto. It is to be appreciated, however, that the present exemplary embodiments are also amenable to other like applications.

Lighting control systems are frequently used to provide illumination to industrial buildings, commercial structures and other large spaces. Generally, lighting control systems include dimmable ballast systems to provide varying levels of light within the system based on any number of conditions such as an event, a time, etc. For multi-lamp fixtures, conventional dimming ballast techniques include discrete dimming (so-called "step-dimming") and continuous dimming. One example of discrete dimming is a multiple-lamp discrete ballast in which one or more lamps are shut off to provide a lower light output. This is sometimes implemented using external controls to turn off individual ballasts or fixtures until the selected light level is achieved. Discrete dimming approaches, however, only provide a finite number of pre-defined lighting levels and transitions between these discrete levels are often perceptible by users.

Some continuous dimming designs operate multiple lamps in series with the power applied to the lamps being reduced for dimming. Series-connected dimming ballasts, however, suffer from inability to produce light when one or more lamps fail. Other proposed approaches include varying a DC bus amplitude via pulse width modulation (PWM) control to power a voltage or current fed inverter for driving one or more lamps, but this dimming control technique adds cost and may not provide the desired amount of dimming for certain applications. Continuous dimming techniques require auxiliary cathode heating power to keep the cathode operating within its normal temperature range at deep dimming levels. Failure to provide adequate auxiliary heat to the cathode at low current levels will result in cathode failure and short lamp life. Auxiliary cathode heating, however, contributes to inefficiency at dimming levels below a critical arc power level since the cathode heating power contributes no lamp light output. Thus, it may take as much as 75% of full lamp input power to provide 50% of full lamp lumens output.

Conventional lighting systems can also require all lights within an array to be dimmed to achieve a desired light output. Conventional dimming ballasts with continuous light level control are typically more expensive due to the necessary auxiliary cathode heating circuitry. Continuous dimming ballasts, moreover, suffer from reduced power efficiency. Thus, there is a need for improved fluorescent lamp dimming apparatus and techniques for efficiently providing varying lighting levels to match a desired lighting level while maintaining high efficiency and without lamp stress or damage or increased cost, thereby allowing a user to selectively achieve energy savings by dimming lighting installations.

BRIEF DESCRIPTION

According to an aspect, a lighting system includes a plurality of fixtures, wherein each fixture includes a plurality of fluorescent lamps. A dimming ballast is operatively coupled to each fixture, each dimming ballast receives power from an outside source that is delivered to the fluorescent lamps within each corresponding fixture. A control module communicates with each dimming ballast, the control module receives a lighting level from an outside source, determines the most power efficient lighting solution and outputs a control signal to each dimming ballast related to the light output level of each lamp within each fixture.

According to another aspect, a lighting system includes a plurality of fixtures, wherein each fixture includes a plurality of fluorescent lamps. A dimming ballast is operatively coupled to each fixture, each dimming ballast receives power from an outside source that is delivered to the fluorescent lamps within each corresponding fixture. A control module communicates with each dimming ballast, the control module receives a signal representative of a lighting level from an outside source and selectively dims one or more lamps while controlling all the remaining lamps to be substantially at 0% or 100% power at least partially according to the dimming level setpoint.

According to yet another aspect, a method is employed to power a plurality of fixtures within a lighting system. A dimming level setpoint value or signal indicating a desired dimming level for the lighting system is received. One or more fixtures are selectively dimmed while all the remaining fixtures are controlled to be substantially at 0% or 100% power at least partially according to the dimming level setpoint.

BRIEF DESCRIPTION OF THE DRAWINGS

FIGS. 5-20 are simplified schematic diagrams illustrating operation of the ballast embodiment of FIGS. 1 and 2 for dimming at various exemplary levels.

DETAILED DESCRIPTION

Figure 1:
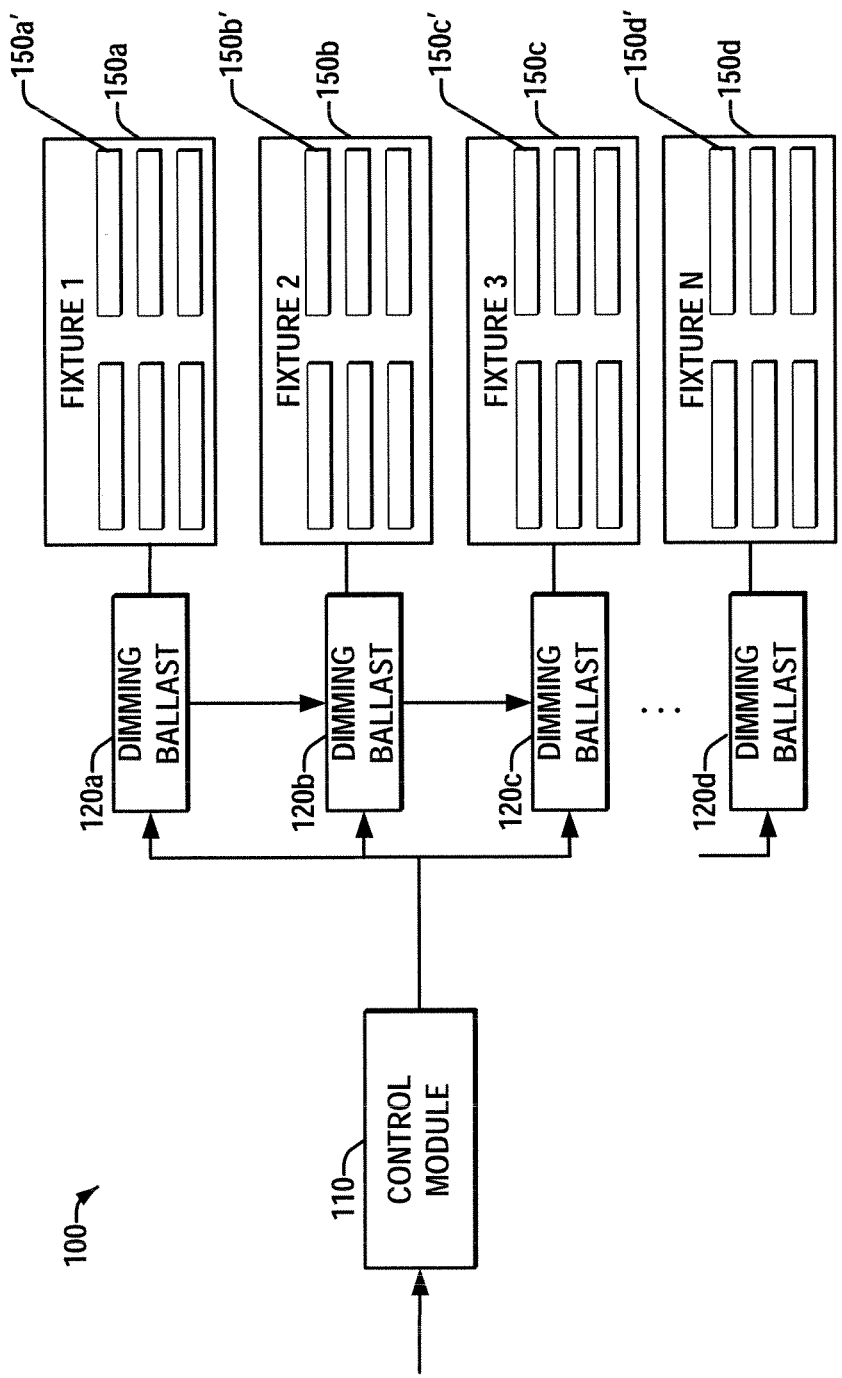
FIG. 1 illustrates a lighting system that obtains a desired light level based on power efficient principals.

FIG. 1 illustrates a lighting system 100 that includes a control module 110 to control the light output from a plurality of light fixtures 150a, 150b, 150c and 150d via corresponding dimming ballasts 120a, 120b, 120c and 120d. The fixtures 150a-d include one or more lamps 150a', 150b', 150c', and 150d' and are representative of any number of fixtures disposed in within a predefined space such as a building, a room, a zone, etc. The control module 110 receives a desired light level from an outside source and determines an appropriate current to deliver to each lamp 150a'-d' within each fixture to achieve the light level. An algorithm can be employed to generate a desired light level while at the same time maintaining a high level of efficiency with regard to the power used by the lamps. The algorithm can also deliver power to facilitate an imperceptible transition between light levels. A plurality of factors can be considered to achieve these goals including the number of lamps at full on/off, the number of lamps that are dimmed, the current level delivered to each lamp and duration of time since each lamp was powered on.

One way to facilitate an efficient use of power is to minimize the number of lamps that are in a low dimmed state. This is because light output is proportional to efficiency of power consumption, thereby rendering a lamp less efficient as it is dimmed. For example, the relative efficiency for a lamp can be around 95% at 100% light output versus around 55% at 10% light output. In order to keep the efficiency level high, the algorithm can be utilized to identify solutions wherein a maximum number of lamps are at either full on or full off. In addition, the algorithm can insure that the few number of lamps that must be set in a dimmed state are set closer to a full on state rather than an off state to keep efficiency as high as possible.

Certain types of lamps (e.g., cold cathode) are not operated below a predetermined current threshold to insure reliability. For example, a lamp may draw 280 mA at full power with a minimum current threshold of 155 mA before turnoff. Substantially any level is contemplated, however, which can comply with known industry standards such as those set forth in the NEMA LL-9-2009 Dimming of T8 Fluorescent Lighting Systems standard, for example. Assuming a relatively linear current to light output, the lamp can be at around fifty percent light output before the current threshold is reached. Thus, the above inefficiency problem can be mitigated as such lamps run with relatively high efficiency or not at all. In addition, the current threshold for each lamp can be related to a brightness level, which is noticeably brighter than a lamp that is turned off. To counter such a highly perceptible condition, the control module 110 can modify light output from other lamps within the system 100. The number and relative spacing of lamps can be set at particular light outputs to allow for a smooth transition between light levels. This can be particularly effective when the fixtures are located at a greater distance from the floor.

The algorithm can select particular lamps within each fixture 150a-d to be illuminated based on the duration of time that each lamp was last turned on. Lamps that have the longest time since they were last illuminated can be associated with the highest priority so they are the next to be turned on. In order to maintain a given light level, lamps can be illuminated iteratively on a rotating basis. The iteration can be based on substantially any metric such as a period of time, a new light level input, an event, etc. Once the iteration takes place, the lamp rotation can be effected as determined by the algorithm to extinguish or dim illuminated lamps from the previous iteration and to illuminate lamps that were previously extinguished.

This methodology is employed by the algorithm to maximize the life expectancy of the lamps, which is generally quantified in hours of operation. In order to extend the life of the lamps to a maximum amount of time, the algorithm can optimize the collective hours for all the lamps within each fixture 150a-d and/or within the lighting system 100. In one aspect, the lamps are illuminated on a rotating basis upon particular dimming light output demands. For example, a fixture with lamps numbered 1-16 can be dimmed to 50% light output. To meet this requirement, lamps 1, 3, 5, 7, 9, 11, 13, and 15 can be set at full power wherein lamps 2, 4, 6, 8, 10, 12, 14, and 16 are full off. For the next iteration, lamps 1, 3, 5, 7, 9, 11, 13, and 15 can be set at full off wherein lamps 2, 4, 6, 8, 10, 12, 14, and 16 are at full power. Lamps can be dimmed as appropriate to transition between iterations, which is substantially imperceptible to an observer. This methodology can be repeated any number of times over a given period and is contemplated to apply to substantially any scale such as per lamp, per fixture, per subsystem, etc.

Once the control module 110 receives a desired average light output for the fixtures 150a-d, the control module 110 sends signals to each dimming ballast 120a-d to modify the light output of the lamps within the fixtures 150a-d coupled respectively thereto. For example, for a light level between 75 and 100% the control module 110 dims only a light level of lamps within the fixture 150a to the necessary level to achieve the desired average light level. For a light level between 50 and 75%, the control module 110 turns off the fixture 150a, and dims the fixture 150b on the next circuit to the necessary level to achieve the desired average light level. For a light level between 25% and 50%, the fixtures 150a and 150b are turned off and the fixture 150c is dimmed. For a light level between full-dim and 25%, the fixtures 150a, 150b and 150c are turned off and the fixture 150d is in a fully dim state. In one embodiment, the control module 110 operates at number of discrete levels (e.g., determined by the number of fixtures 150 it controls) wherein the transition between each level is performed smoothly and slowly such that the transition is not noticeable to the casual observer.

The control module 110 can control the light level of fixtures on multiple circuits that are installed in an alternating pattern. A user can select a desired average light level and the control module 110 can adjust the current delivered to the circuits to the level required to achieve the set point at maximum efficiency. In one example, a 0-10 VDC signal representative of a particular light level is sent from the control module 110 to the appropriate dimming ballasts 120a-d. It is to be appreciated, however, that substantially any output signal (e.g., digital, analog, DALI, etc.) can be employed for such control.

Figure 2:
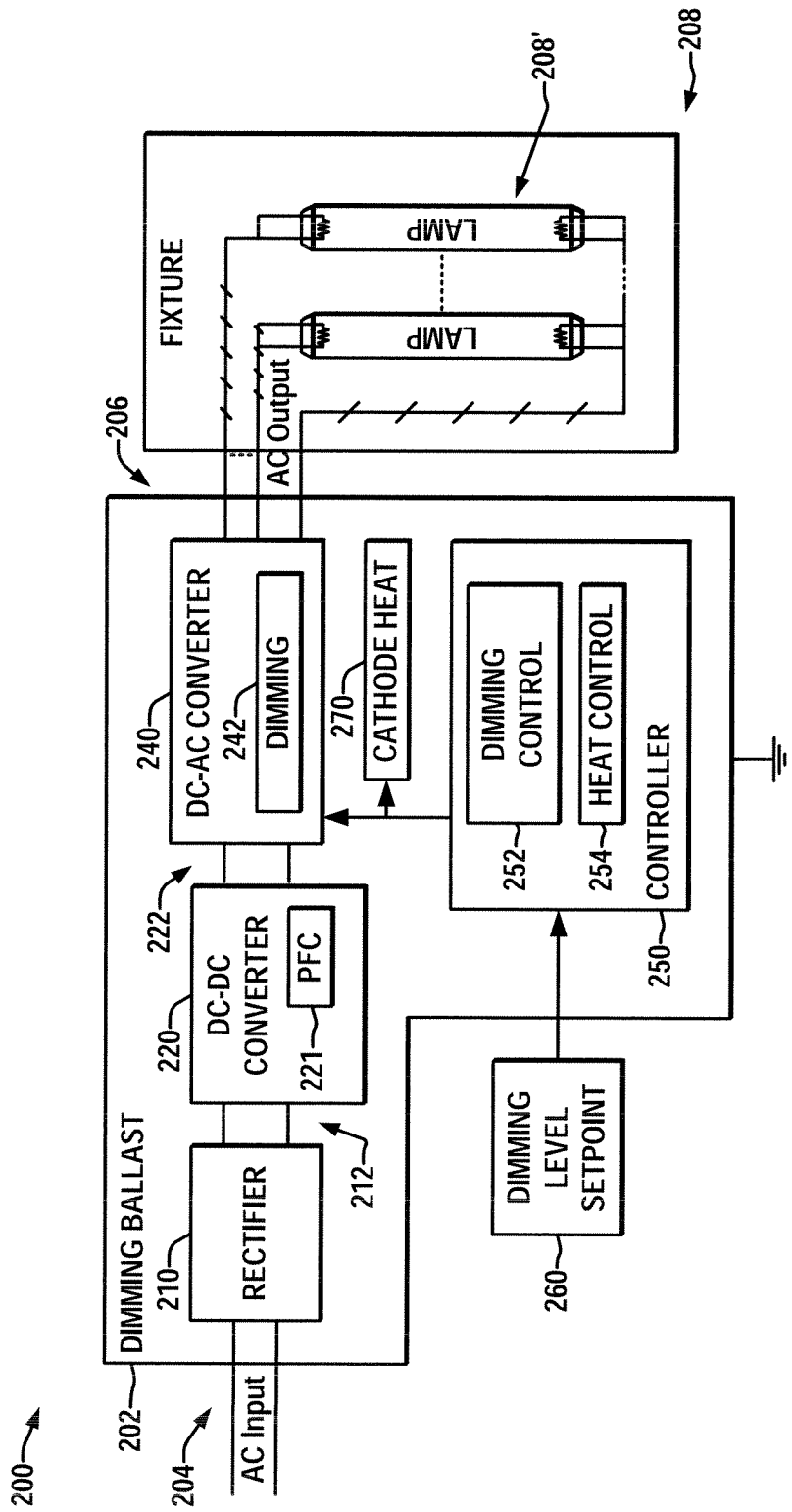
FIG. 2 is a schematic diagram illustrating an embodiment of the dimming ballast of FIG. 1 in which the controller selectively dims one or more predetermined lamps while controlling all the remaining lamps to be substantially full on or off.

FIG. 2 illustrates a lighting system 200 that includes an exemplary dimming ballast 202 with a DC power source including a rectifier 210 and a DC-DC converter 220 to receive AC power at an input 204 and to provide DC electrical power 222 to a DC-AC converter 240. The dimming ballast 202 can be representative of the ballasts The DC-AC converter 240 converts the DC power 222 to provide an AC output 206 driving two or more lamps 208', wherein the lamps 208' are disposed within one or more fixtures 208. The rectifier 210 in the illustrated embodiment receives the input AC 204 and provides an intermediate DC 212 to the converter 220, which is a switching type DC-DC converter 220 in one implementation, where the converter 220 can be a boost converter with a power factor correction (PFC) component 222 to also control the power factor of the ballast 202. In other possible embodiments, the intermediate DC-DC converter can be omitted.

The ballast 202 includes a controller 250 operatively coupled with the DC-AC converter 240 to control power applied to the lamps 208, and may also provide control signals to a dimming circuit 242 of the DC-AC converter 240, as well as to an optional cathode heating circuit 270 for selective heating of one or more lamp cathodes. The controller 250 can be any suitable types of hardware, software, or combinations thereof, and includes a dimming control component 252 and a heat control component 254.

Controller 250 receives a dimming level setpoint 260 via the control module 110, such as a signal or value and operates to selectively dim one or more lamps 208 while controlling the remaining lamps 208 to be substantially at 0% or 100% power based at least in part on the dimming level setpoint 260. The on/off control of the other lamps 208 need not be strictly 100% and 0% of rated power, respectively, wherein the on state can be within 2-3% of rated power and the off state can be up to 2-3% of rated power to constitute substantially 100% and substantially 0% as used herein.

By dimming a small number of lamps (e.g., one) at any given time, cathode heating only needs to be applied to the dimmed lamp, thereby reducing the amount of energy expended on non-lighting functions in the ballast 202. In addition, a low number of lamps 208' is in a lower efficiency dimmed mode of operation, thereby increasing the overall efficiency of the ballast 202 compared with conventional continuous dimming approaches. In this regard, linear fluorescent lamps 208' are most energy efficient when operating near their rated power, and as the power into the lamp is reduced (e.g., during dimming), the luminous output decreases faster than the input power, such that the user is provided with greatly reduced light levels for only slightly reduced power consumption. The disclosed ballast 202 thus facilitates reduction in user lighting energy consumption without significant energy cost impact.

Figure 3:
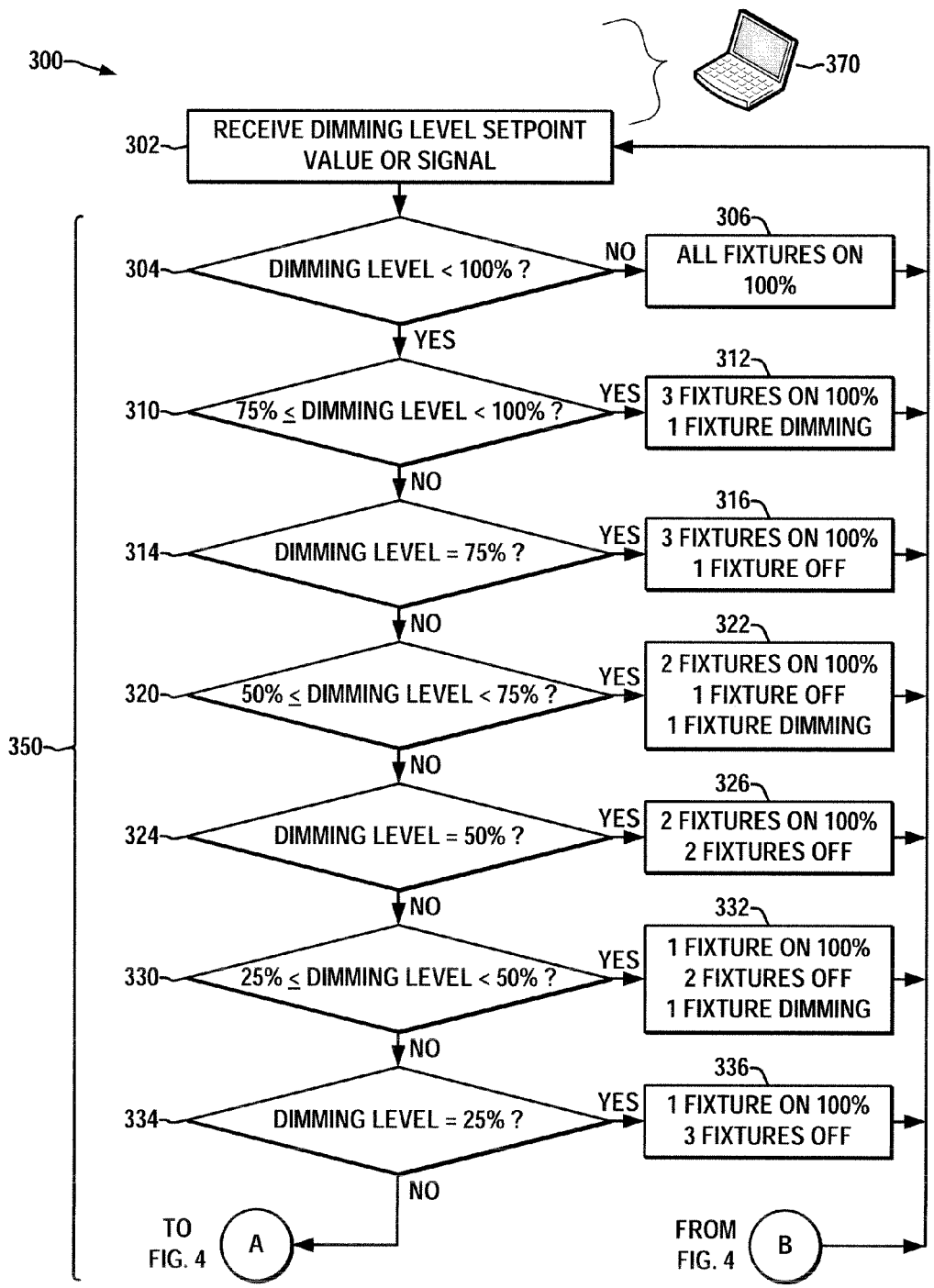
FIGS. 3 and 4 provide a flow diagram illustrating an exemplary method for powering fluorescent lamps.
Figure 4:
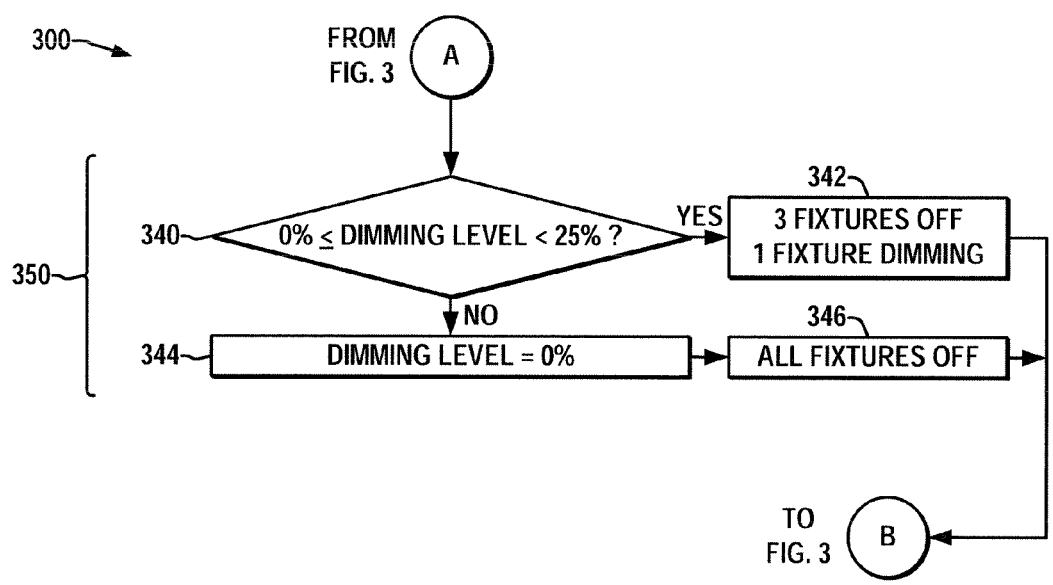
Figure 5:
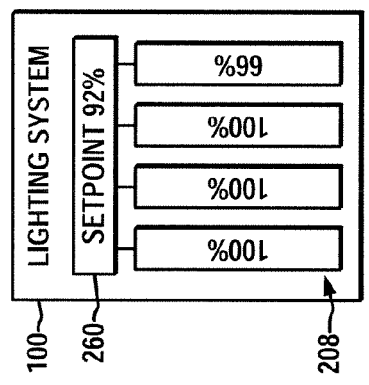
Figure 6:
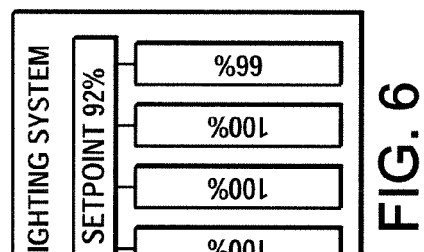
Figure 7:
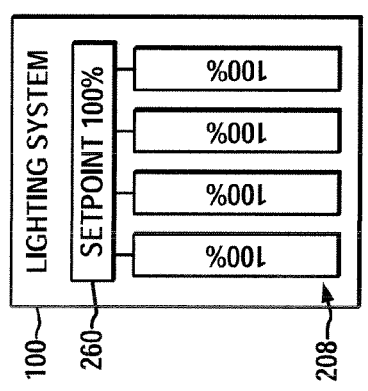
Figure 8:
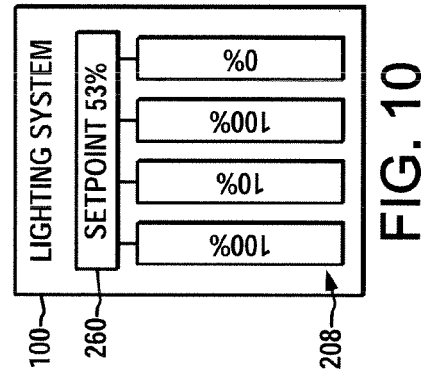
Figure 9:
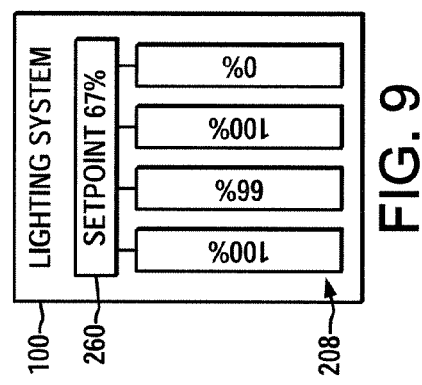
Figure 10:
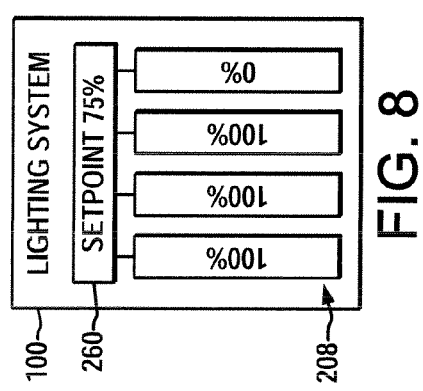

FIGS. 3 and 4 depict a flow diagram illustrating an exemplary process 300 for powering a plurality of fixtures within a lighting system, which may be controlled by the control module 110. FIGS. 5-20 illustrate operation of the control module 110 of FIGS. 1 and 2 for dimming at various exemplary levels of the setpoint 260 received from the control module 110. While the process 300 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, such as in the exemplary controller 250 above, in order to provide the selective dimming control concepts illustrated and described herein.

The process 300 begins in FIG. 3 with receipt at 302 of a dimming level setpoint value or signal (e.g., setpoint 260 above) indicating a desired dimming level for the lighting system 100. Selective dimming is then performed at 350 of one or more fixtures 150a-d while controlling all the remaining fixtures 150a-d to be substantially at 0% or 100% power at least partially according to the dimming level setpoint 260 received at 302. In the example of FIG. 3, a determination is made at 304 as to whether the setpoint dimming level is less than 100%. If not (NO at 304), all fixtures are turned on at 306 (exemplary system condition shown in FIG. 5), and the process 300 returns to receive another setpoint at 302. If the dimming level is below 100% (YES at 304), a determination is made at 310 as to whether the dimming level is between 75% and 100%. If so, three fixtures are turned on at full brightness and one fixture is dimmed at 312 (exemplary system conditions shown in FIGS. 6 and 7) and the process 300 returns to receive another setpoint at 302.

If the dimming level is not between 75% and 100% (NO at 310), however, a determination is made at 314 as to whether the dimming level equals 75%. If so (YES at 314), three fixtures are turned on at full brightness and the other fixture is turned off at 316 (system condition shown in FIG. 8) and the process 300 returns to receive another setpoint at 302. If not (NO at 314), a determination is made at 320 as to whether the dimming level is between 50% and 75%. If so, two fixtures are turned on at full brightness, one fixture is turned off, and one fixture is dimmed at 322 (exemplary system conditions shown in FIGS. 9 and 10) and the process 300 returns to receive another setpoint at 302.

If not (NO at 320), a determination is made at 324 as to whether the dimming level equals 50%. If so (YES at 324), two fixtures are turned on at full brightness and two fixtures are turned off at 326 (FIG. 11) and the process 300 returns to receive another setpoint at 302. If the level is not equal to 50% (NO at 324), a determination is made at 330 as to whether the dimming level is between 25% and 50%, and if so, one fixture is turned on at full brightness, two fixtures are turned off, and 1 fixture is dimmed at 332 and the process 300 returns to receive another setpoint at 302. If the dimming level is not between 25% and 50% (NO at 330), a determination is made at 334 as to whether the dimming level is equal to 25%.

If so (YES at 334), one fixture is turned on at full brightness and three fixtures are turned off at 336 (FIG. 12) and the process 300 returns to receive another setpoint at 302. If the dimming level does not equal 25% (NO at 334), the process 300 continues to FIG. 4 with a determination being made at 340 as to whether the dimming level is between 0% and 25%. If so, three of the fixtures are turned off and one fixture is dimmed at 342 (exemplary system conditions shown in FIGS. 13 and 14) and the process 300 returns to receive another setpoint at 302 in FIG. 3. If not (NO at 340 in FIG. 4), the dimming level is determined to be 0% at 344 and all fixtures are turned off at 346 (FIG. 15), after which the process 300 returns to 302 in FIG. 4 to receive another setpoint 260 via the control module 110.

Other embodiments of the process 300 are possible in which cathode heating is selectively provided to one or more cathodes of lamps within the fixture(s) 208 being dimmed. In certain embodiments, moreover, receiving the dimming level setpoint value or signal at 302 may include receiving the dimming level setpoint value or signal 260 indicating a desired one of a plurality of predetermined discrete levels for the dimming ballast 202. In this embodiment, the selective dimming at 350 may include selectively dimming at most one of the fixtures 208 slowly in concert with selectively turning one or more of the other fixtures 208 on or off so as to smoothly transition between predetermined levels.

The exemplary ballasts 120a-d, 202 and process 300 facilitates maintenance of high fixture efficiency while not causing abrupt light level changes associated with conventional continuous and discrete dimming techniques. Various embodiments, moreover, provide for selective application of power to heat the cathodes of one or more lamps within the fixtures 208 in order to allow the lamps to operate to its rated life. The embodiments of the process 300 of FIG. 3, moreover, allow the controller 250 to vary which fixture is dimmed for different light levels in order to even out any possible system effects on lamp life. These techniques, individually or in combination, provide for reduction in energy consumed by the ballast 202 compared to conventional dimming ballasts, and may further mitigate or avoid quick transients in lighting level when the dimming setpoint value is changed.

A computer 370 illustrates one possible hardware configuration to support the systems and methods described herein, including the process 300 above. It is to be appreciated that although a standalone architecture is illustrated, that any suitable computing environment can be employed in accordance with the present embodiments.

The computer 370 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer 370, such as during start-up, is stored in ROM.

The computer 370 can further include a hard disk drive, a magnetic disk drive, e.g., to read from or write to a removable disk, and an optical disk drive, e.g., for reading a CD-ROM disk or to read from or write to other optical media. The computer 370 typically includes at least some form of computer readable media. Computer readable media can be any available media that can be accessed by the computer 370. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 370.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 370 can be any of a number of commercially available operating systems.

A user may enter commands and information into the computer 370 through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer 370 typically includes other peripheral output devices (not shown), such as speakers, printers etc. The monitor can be employed with the computer 370 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 370 via any wireless or hard wire protocol and/or standard.

The computer 370 can operate in a networked environment using logical and/or physical connections to one or more remote computers, such as a remote computer(s). The remote computer(s) can be a workstation, a server computer, a router, a personal computer, a microprocessor based entertainment appliance, a peer device or other common network node, and typically includes many or all of the elements described relative to the computer 370. The logical connections depicted include a local area network (LAN) and a wide area network (WAN). Such networking environments are commonplace in offices, enterprise-wide computer networks, intranets and the Internet.

When used in a LAN networking environment, the computer 370 is connected to the local network through a network interface or adapter. When used in a WAN networking environment, the computer 370 typically includes a modem, or is connected to a communications server on the LAN, or has other means for establishing communications over the WAN, such as the Internet. In a networked environment, program modules depicted relative to the computer 370, or portions thereof, may be stored in the remote memory storage device. It will be appreciated that network connections described herein are exemplary and other means of establishing a communications link between the computers may be used.

FIGS. 5-20 set forth exemplary embodiments to achieve a particular light outputs at a system or subsystem level. It is to be appreciated that these embodiments can be scaled to down to a fixture or lamp level to achieve a desired light output. In particular, FIGS. 5-15 illustrate embodiments wherein lamps can be dimmed below a predetermined current threshold to obtain a light output less than 50%, in one example. In contrast, FIGS. 16-20 illustrate embodiments wherein lamps are turned off once they reach a current threshold equal to a fifty percent light output. Although the fixtures in FIGS. 16-20 include three lamps it is to be appreciated that the fixtures can include substantially any number of lamps.

Figure 18:
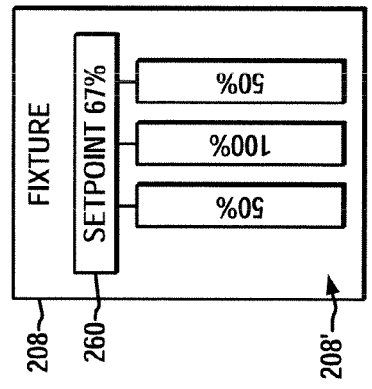
Figure 17:
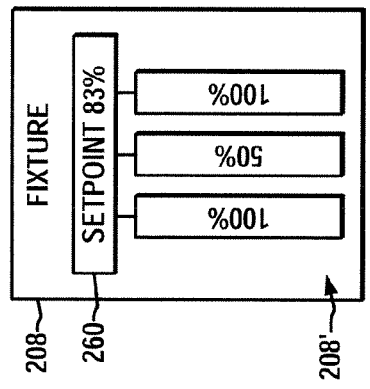
Figure 16:
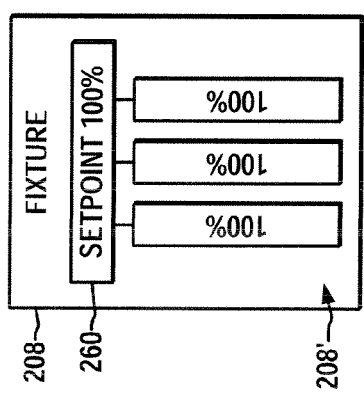
Figure 20:
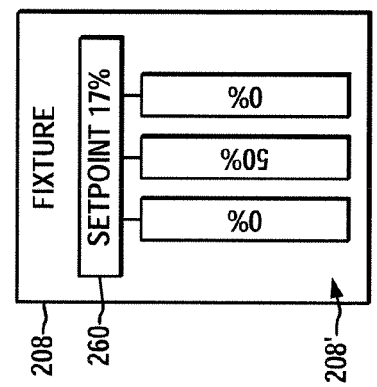
Figure 19:
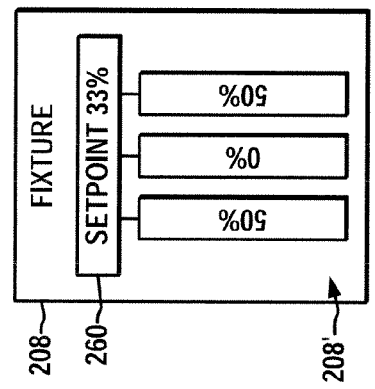

FIG. 16 includes all three lamps set at 100% thereby generating a 100% light output for the fixture 208. FIG. 17 includes two lamps set at 100% and one lamp at 50% to generate a 83% light output for the fixture 208. FIG. 18 includes two lamps at 50% and one lamp at 100% thereby generating an overall light output of 67% for the fixture 208. FIG. 19 includes two lamps set at 50% and one lamp at 0% to generate a 33% light output for the fixture 208. FIG. 20 includes two lamps set at 0% and one lamp set at 50% thereby generating a 17% light output for the fixture 208. Thus, a wide range of light output levels could be obtained based on a plurality of lamps even with a limited operating range.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure.

Although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. However, modifications and alterations will occur to others upon reading and understanding the preceding detailed description. It is intended that the invention be construed as including all such modifications and alterations.

The invention claimed is:

1. A lighting system, comprising:
a plurality of fixtures, wherein each fixture includes a plurality of fluorescent lamps;
a plurality of dimming ballasts wherein one of the plurality of dimming ballasts is operatively coupled to a respective one of the plurality of fixtures, each dimming ballast receives power from an outside source that is delivered to the fluorescent lamps within each corresponding fixture, wherein the dimming ballast includes:
a DC power source operative to provide DC electrical power;
a DC-AC converter coupled to receive the DC electrical power from the DC power source and operative to provide an AC output to drive a plurality of lamps;
a controller operatively coupled with the DC-AC converter to control power applied to the lamps, the controller being operative at least partially according to a dimming level setpoint to selectively dim at most one of the lamps while controlling all the remaining lamps to be substantially at 0% or 100% power; and
a control module that communicates with each dimming ballast, the control module receives a lighting level from an outside source, determines the most power efficient lighting solution and outputs a control signal to each dimming ballast related to the light output level of each lamp within each fixture.

2. The dimming ballast of claim 1, wherein the controller is operative to selectively dim only a predetermined one of the plurality of lamps while controlling all the remaining lamps to be substantially at 0% or 100% power at least partially according to the dimming level setpoint.

3. The dimming ballast of claim 1, wherein the controller is operative to select one or more of the plurality of lamps for dimming operation and to selectively dim only the one or more selected lamps while controlling all the remaining lamps to be substantially at 0% or 100% power at least partially according to the dimming level setpoint.

4. The dimming ballast of claim 3, wherein the controller is operative to provide dimming at a plurality of predetermined levels according to the dimming level setpoint, and where the controller selectively dims the selected lamp slowly in concert with selectively turning one or more of the other lamps on or off so as to smoothly transition between predetermined levels.

5. The dimming ballast of claim 1 wherein the controller is operative to selectively dim only a predetermined one of the plurality of lamps while controlling all the remaining lamps to be substantially at 0% or 100% power at least partially according to the dimming level setpoint.

6. The dimming ballast of claim 1, wherein the controller is operative to select one of the plurality of lamps for dimming operation on a rotating basis.

7. The dimming ballast of claim 1, wherein the controller is operative to select one of the plurality of lamps for dimming operation by random selection or round-robin selection.

8. The dimming ballast of claim 1, wherein the controller is operative to provide dimming at a plurality of predetermined levels according to the dimming level setpoint, and where the controller selectively dims the selected lamp slowly in concert with selectively turning one or more of the other lamps on or off so as to smoothly transition between predetermined levels.

9. The dimming ballast of claim 1, wherein the DC-AC converter comprises a plurality of inverters individually operative to drive one or more of the plurality of lamps, at least one of the inverters including a dimming circuit operable by the controller to selectively dim the one of the plurality of lamps.

10. The dimming ballast of claim 1, wherein the DC power source is operative to receive AC input power and to provide DC electrical power.

11. The lighting system according to claim 1, wherein the control module does not deliver power to a lamp if the power level is below a predetermined threshold.

12. A lighting system, comprising:
a plurality of fixtures, wherein each fixture includes a plurality of fluorescent lamps;
a plurality of dimming ballasts wherein one of the plurality of dimming ballasts is operatively coupled to a respective one of the plurality of fixtures, each dimming ballast receives power from an outside source that is delivered to the fluorescent lamps within each corresponding fixture;
a control module that communicates with each dimming ballast, the control module receives a signal representative of a lighting level from an outside source and selectively dims one or more lamps while controlling all the remaining lamps to be substantially at 0% or 100% power at least partially according to the dimming level setpoint, wherein the signal comprises receiving the dimming level setpoint value or signal indicating a desired one of a plurality of predetermined discrete levels for the fixture; and wherein selectively dimming at most one of the fixtures comprises selectively dimming at most one of the fixtures slowly in concert with selectively turning one or more of the other fixtures on or off so as to smoothly transition between predetermined levels.

13. The lighting system according to claim 12, wherein lamps are illuminated iteratively.

14. The lighting system according to claim 13, wherein an iteration is based on one or more of a time period, a signal change and an event.

15. The method according to claim 12, wherein the fixtures are not lit if the expected power delivery is less than a predetermined threshold.

16. A method of powering a plurality of fixtures within a lighting system, the method comprising:
receiving a dimming level setpoint value or signal indicating a desired dimming level for the lighting system; and
selectively dimming one or more fixtures while controlling all the remaining fixtures to be substantially at 0% or 100% power at least partially according to the dimming level setpoint, wherein receiving the dimming level setpoint value or signal comprises receiving the dimming level setpoint value or signal indicating a desired one of a plurality of predetermined discrete levels for the fixture; and wherein selectively dimming at most one of the fixtures comprises selectively dimming at most one of the fixtures slowly in concert with selectively turning one or more of the other fixtures on or off so as to smoothly transition between predetermined levels.

17. The method according to claim 16, wherein the fixtures are not lit if the expected power delivery is less than a predetermined threshold.

* * * * *